Aug. 9, 1932.  F. H. SHEPARD, JR  1,870,824
HYDRAULIC TRANSMISSION MECHANISM
Filed Jan. 10, 1929  4 Sheets-Sheet 1

INVENTOR
Francis H. Shepard, Jr.
BY
ATTORNEY

Aug. 9, 1932.  F. H. SHEPARD, JR  1,870,824
HYDRAULIC TRANSMISSION MECHANISM
Filed Jan. 10, 1929   4 Sheets-Sheet 3
Fig. 3.
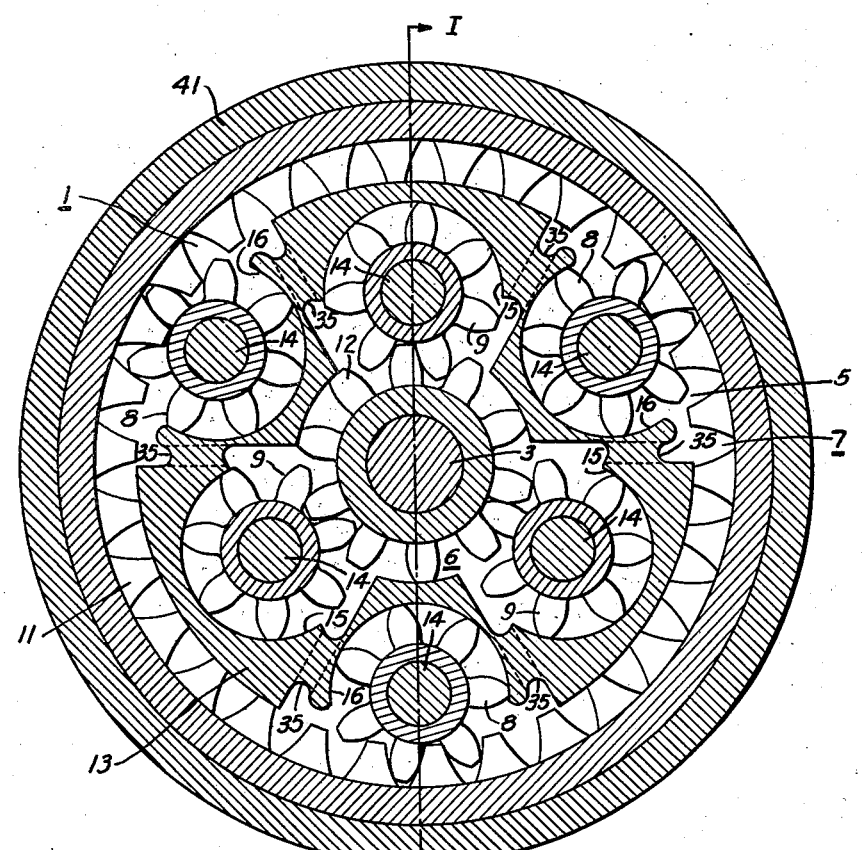
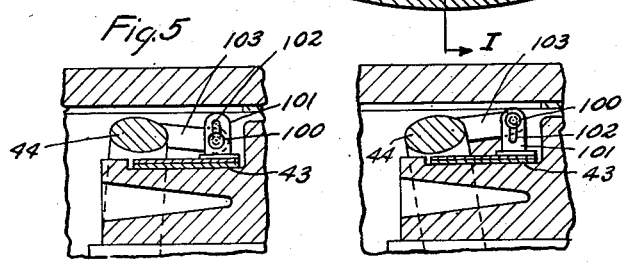
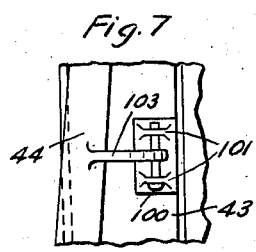
INVENTOR
Francis H. Shepard, Jr.
BY
ATTORNEY Aug. 9, 1932.  F. H. SHEPARD, JR  1,870,824
HYDRAULIC TRANSMISSION MECHANISM
Filed Jan. 10, 1929  4 Sheets-Sheet 4

INVENTOR
Francis H. Shepard, Jr.
BY
ATTORNEY

Patented Aug. 9, 1932

1,870,824

UNITED STATES PATENT OFFICE

FRANCIS H. SHEPARD, JR., OF NEW ROCHELLE, NEW YORK

HYDRAULIC TRANSMISSION MECHANISM

Application filed January 10, 1929. Serial No. 331,629.

My invention relates, in general, to transmission mechanisms and, in particular, to hydraulic speed-changing transmission devices.

An object of my invention is to provide a transmission mechanism which is capable of transmitting power between a driving and a driven member at any desired speed ratio within a predetermined range.

Another object of my invention is to provide a transmission device in which the speed ratio between the driving and the driven members may be automatically adjusted in response to the torque on the driven member.

A further object of my invention is to provide for utilizing a hydraulic pump to control the speed ratio between a driving and a driven member in order to obtain any desired speed ratio by changing the displacement volume of the pump.

It is also an object of the invention to provide for controlling the volume of fluid delivered by a pump without varying the pump speed, thereby to control the speed of the transmission system.

Heretofore, it has been customary to effect changes in speed between a driving and a driven member by means of a gear reduction mechanism. As is well known, such gear reduction mechanisms are objectionable in that they are limited to a small number of speed ratios and the speed ratio cannot be changed without disconnecting the driving member from the transmission mechanism. By means of my invention, I provide a speed-changing device which may be adjusted to any desired speed ratio, within certain limits, while it is transmitting power.

The foregoing and other objects of my invention may be accomplished by means of the transmission mechanism described in the following specification and shown in the drawings, in which:

Fig. 3 is a view, in transverse section, of the transmission mechanism, taken along the line III—III of Figs. 1 and 2.

Figs. 5 and 6 are sectional views of two operative positions of a detail, taken on a sectional plane substantially at right angles to the drawings in Fig. 1.

Fig. 7 is a plan view of the sectional detail shown in Figs. 5 and 6.

Figure 1:
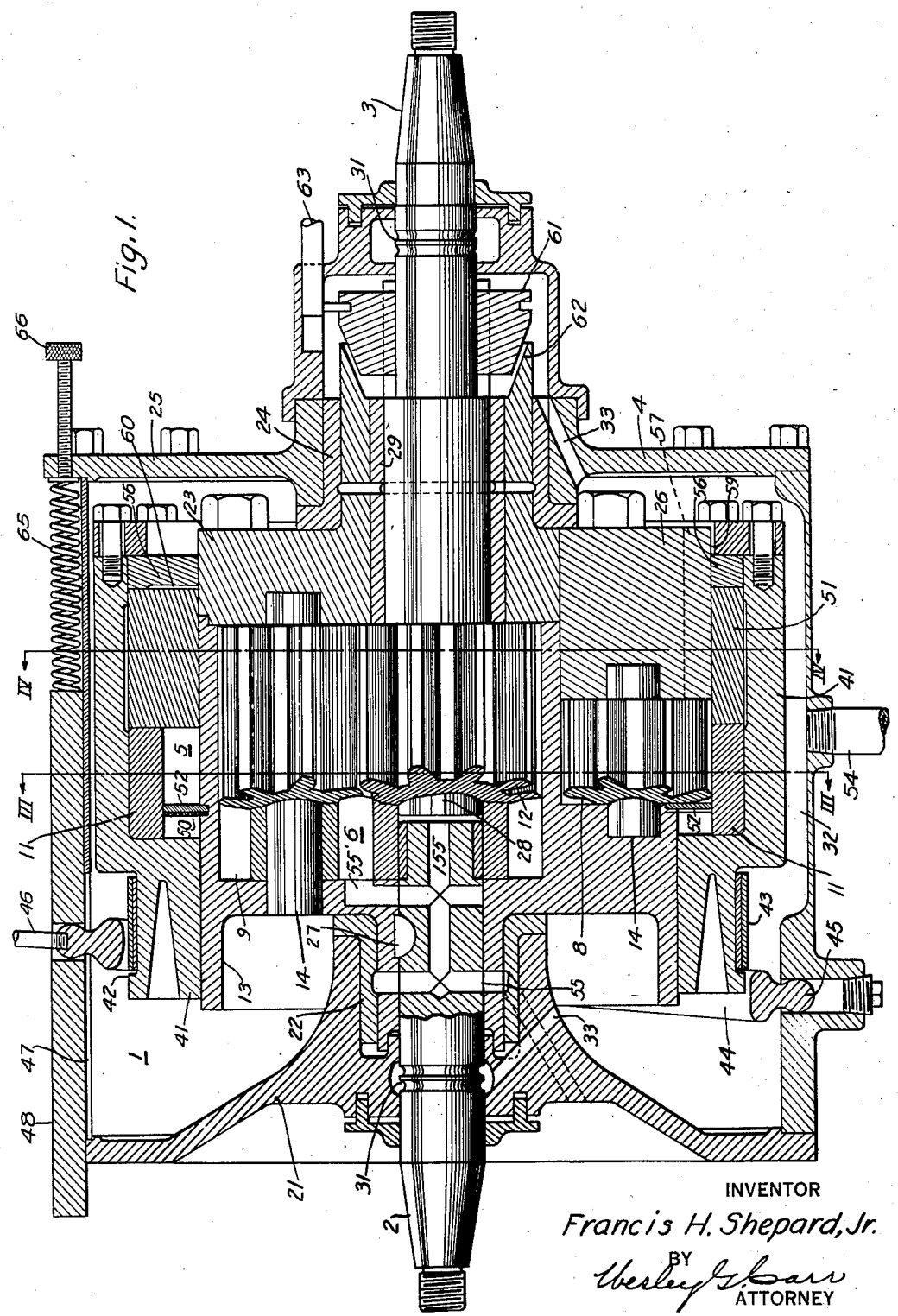
Figure 1 is a view, partly in elevation and partly in longitudinal section, of a hydraulic transmission mechanism, taken along the line I—I of Figs. 3 and 4.
Figure 2:
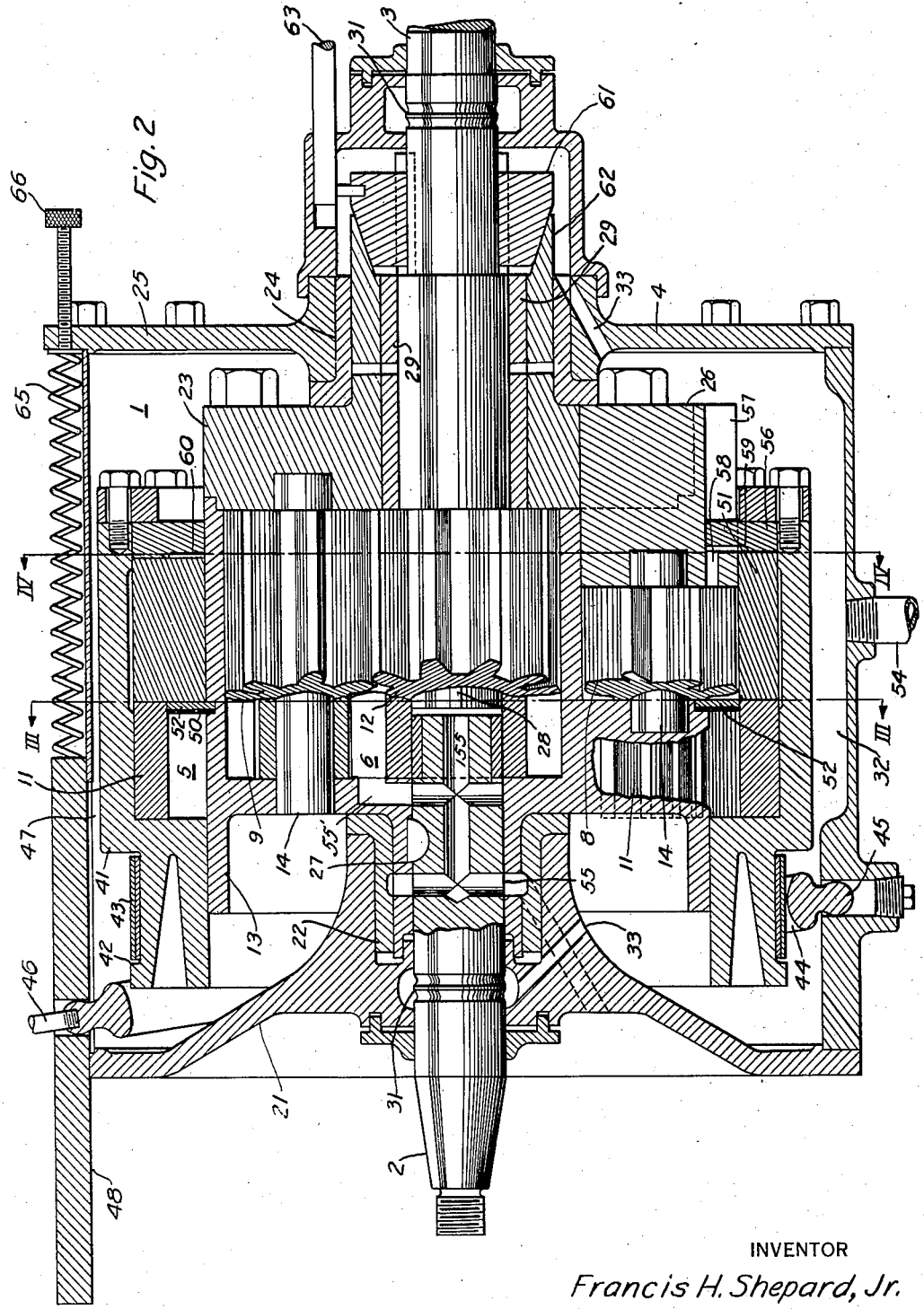
Fig. 2 is a similar view, showing the movable parts of the transmission mechanism in a different position.
Figure 4:
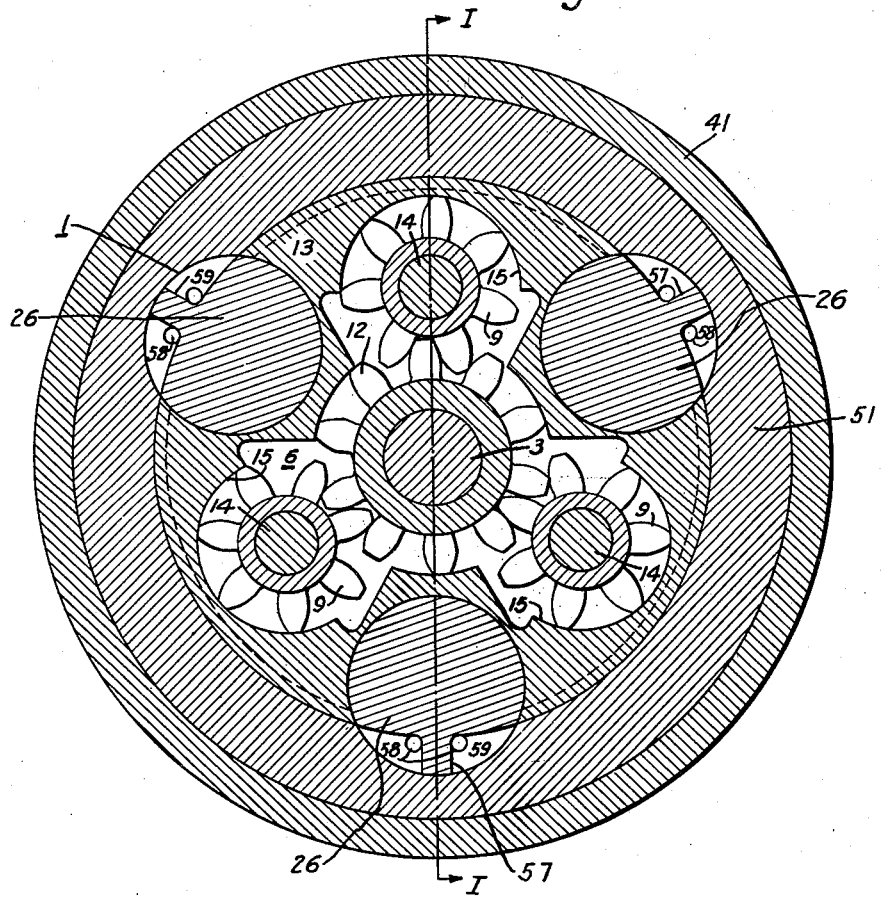
Fig. 4 is another view, in transverse section, taken along the line IV—IV of Figs. 1 and 2.

Referring particularly to Figs. 1 and 2, the transmission mechanism embodying my invention comprises, in general, a speed-reduction device 1, which is disposed to transmit power, at a variable speed ratio, from a driving shaft or member 2 to a driven or output shaft 3, which extend from opposite ends, respectively, of a protective casing 4 that is disposed to completely enclose the speed-reduction mechanism 1.

In order to effect a change in speed between the driven member 3 and the driving member 2, the speed-reduction mechanism 1 is provided with a hydraulic-transmission system that comprises a variable-volume pump 5 and a constant-volume pump 6 which are connected by, and constitute parts of, a closed hydraulic circuit 7.

Each of the pump mechanisms 5 and 6 is provided with two interacting elements. One element of each pump comprises a plurality of pinions 8 and 9 which are carried by the driving member 2. The other element of the variable-volume pump 5 comprises an annular gear member 11 that is normally held stationary relative to the casing 4. The second element of the constant-volume pump 6 comprises a spur gear wheel 12 that is connected to the driven member 3. As a general proposition, inasmuch as the elements 8 and 9 of each of the pumps 5 and 6 are driven and the second element 11 of the pump 5 is held stationary, any change in the volume of the fluid being circulated within the closed circuit 7 will necessarily change the relation of the speed of the driving member 2 to the speed of the other pump element 12 and the driven member 3.

As shown in the drawings, the gear wheel 12, which constitutes part of the constant-volume pump 6 and is mounted on the driven shaft 3, is disposed within a spider member 13 which is mounted on the driving shaft 2 and serves to support the pump elements 8 and 9.

Referring particularly to Fig. 3, it will be readily seen that the pump 6 comprises three pinions 9 that are journalled in the spider 13 upon arbors or pins 14 which are disposed 120° from each other. As shown, the spider 13 is provided with semi-cylindrical openings or chambers 15 for receiving the pinions 9 in such manner that the teeth of the pinions closely engage the wall defining the opening 15 in order that the fluid being pumped may not pass from one tooth space to the next.

The pinions 8 of the variable-volume pump 5 are also journalled in the spider 13, upon suitable arbors 14, in such manner that they mesh with the annular gear wheel 11.

As shown in Fig. 3, the pinions 8 are disposed 120° from each other and are equally spaced between the pinions 9 within semi-cylindrical openings 16. From Fig. 3, it may be readily seen that the spider 13 and the pinions 8 and 9 are so disposed that they constitute a mechanically balanced rotating member. Further, it is obvious that any radial hydrostatic forces that may be set up within either the pump 5 or the pump 6 are substantially balanced.

As shown in Figs. 1 and 2, the pinions 9 are of a greater length than the pinions 8, for the reason that the gear wheel 12, with which the pinions 9 mesh, being of small radius, has a small number of teeth relative to the annular gear wheel 11 and, therefore, in order that the volumes of the pumps 5 and 6 may be substantially equal, it is necessary that the pinions 9 be made longer than the pinions 8.

For supporting the spider 13, the casing 4 is provided with an end plate 21 having a centrally disposed journal bearing 22 that receives a journal formed on one end of the spider 13. The other end of the spider 13 is provided with an end plate 23, a portion of which constitutes a journal that is disposed to turn within a bearing 24 in an end plate 25 that constitutes the other end of the casing 4. By reason of the fact that the pinions 8 are relatively short, it is necessary to provide end plugs 26 that are inserted within those portions of the cylindrical openings 16 which are not occupied by the pinions 8 and serve to support the corresponding ends of the arbors 14. For transmitting power to the spider 13, the driving shaft 2 is securely fastened within the journal portion on the end thereof by means of a key 27. The driven shaft 3, which receives power from the gear wheel 12, is securely fastened thereto by means of a key 28 and extends through a journal bearing 29 which is disposed within the journal portion of the end-plate member 23. Each of the shafts 2 and 3 is provided with an oil thrower 31 that is disposed to prevent fluid from leaking from the casing 4 and to return such as may leak through the bearings 22, 24 and 29 to a sump 32 in the bottom of the casing 4 by means of ducts 33.

As shown in Fig. 3, the transmission fluid passes from the pump 5 to the pump 6 and back to the pump 5 again through passages 35 which constitute parts of the closed hydraulic circuit 7. By reason of the compact construction of the speed-changing device, the passages 35 are made relatively large and constitute a direct hydraulic connection between the two pumps, which is of sufficient cross sectional area to enable the fluid to be transmitted without serious friction losses.

To provide means for supporting the annular gear wheel 11, which constitutes part of the pump mechanism 5, the speed-reducing device is encircled by an annular housing or gear-rim holder 41 into which the annular gear 11 may be pressed or otherwise secured. For the purpose of holding the gear rim 11 stationary, relative to the casing 4, the gear-rim holder 41 is provided, at one end, with a cylindrical surface or brake drum 42 which is disposed to be engaged by a brake band 43 of well known construction. In order to transmit the reaction torque of the annular gear 11 to the casing 4, a torque-reaction ring 44 is provided. The torque-reaction ring 44 is secured to the brake band 43 in any suitable manner, preferably in such manner that it exerts substantially no radial force upon the brake drum 42.

Figs. 5, 6 and 7 show one method of securing the ring 44 to the band 43. The band 43 is provided with the ears 101 having slots 102. A pin 100 mounted on the arm 103 rigidly secured to ring 44 fits loosely in the slot 102. The cooperative action of the pin and slot is such that the arcuate movement of the ring 44 about ball joint 45 does not interfere with the rectilinear movement of the band 43.

In order that the volumetric displacement or pumping capacity of the pump 5 may be readily varied, the gear-rim holder 41 is so mounted on the spider 13 that it may be moved longitudinally thereon in such manner that the face of the annular gear 11 may be displaced axially, relative to the faces of the pinions 8. The axial displacement of the gear-rim holder 41 is made possible by reason of the fact that the torque-reaction ring 44 is pivoted by means of a ball joint 45 in the bottom of the casing 4 and is provided, at its upper end, with a shifting lever 46 which extends through an opening 47 in the top of the casing 4 that is closed by a slidable cover plate 48. It may be readily seen that, by simply moving the lever 46 in a direction parallel to the axis of the transmission mechanism to the position shown in Fig. 2, the housing 41 and the annular gear 11 may be moved axially relative to the spider 13 and the pinions 8 by reason of the connection between the torque-reaction ring 44 and the brake band 43.

Further, when the face of the annular gear 11 is displaced axially relative to the faces of the pinions 8, the effective length of the teeth in contact is thereby reduced and consequently, the volume displaced by each tooth is less than when full contact is made. Such axial displacement, therefore, results in a variation of the volume displacement of the pump 5.

In order to prevent leakage past the tips of that portion of the teeth of the pinions 8, which are exposed by reason of the axial displacement of the annular gear 11, a baffle ring 51 is provided within the gear-rim holder 41 and adjacent to the annular gear 11. The baffle ring 51 is disposed to rotate with the spider 13 and is provided, on its inner surface, with depressions having concave surfaces which snugly engage the outer surfaces of the pinions 8. As shown in Fig. 1, the baffle ring 51 is so mounted within the gear-rim holder 41 that it maintains close engagement with the ends of the teeth of the annular gear wheel 11 and with the tips of the teeth of the pinions 8 in such manner that leakage of the transmission fluid at the exposed tips of the teeth of the pinions 8 is effectually prevented.

In order to prevent leakage of fluid around the exposed ends of the teeth of the pinions 8, a packing blank 52, which is complementary in shape to the annular gear wheel 11, is disposed around the circumference of the spider 13 in such manner that it completely fills the spaces between the teeth of the annular gear 11. For the purpose of positively sealing the packing blank 52, its surface farthest from the teeth of the pinions 8 is provided with a washer 50 of leather or other suitable packing material which acts as a valve to prevent the flow of transmission fluid from the portion of the annular gear 11 which is out of engagement with the pinions 8. Such transmission fluid as may leak from the speed-reduction mechanism is collected in the sump 32 in the bottom of the casing 4 and may be returned to the active system by means of any suitable pump (not shown) which is disposed to withdraw the fluid through a pipe 54 and force it into the journal bearing 22 from which it is conducted, through passageways 55 and 155 within the driving shaft 2, and the passageway 55' in the spider 13, to the low-pressure side of the pump 6.

As may be readily seen by referring to Fig. 2, when the gear-rim holder 41 is moved to the left out of engagement with the packing blank 52, the pressure of the transmission fluid which is in the space between the ends of the teeth on the pinion 8 and the radial wall of the gear rim holder 41 has a tendency to force the gear-rim holder 41 towards the left. To provide means for counteracting this unbalanced hydrostatic force, the right-hand end of the gear-rim holder 41 is provided with a pressure-balancing ring 56. The ring 56 is provided with slots on its inner surface which are disposed to engage tongues 57 on the outer faces of the end plugs 26. A washer or lining 60 of leather or other suitable material is provided on the surface of the ring 56, adjacent to the baffle ring 51, to prevent leakage. As shown, the faces of the end plugs 26 which are in engagement with the ends of the teeth of the pinions 8, present circular baffle walls which are pierced by passageways 58 at the sides of the tongues 57. The passageways 58 admit fluid, under pressure, from between the teeth of the pinions 8 into chambers 59 which are formed between the solid ends of the plugs 26 and that portion of the pressure-balancing ring 56 which is adjacent to the tongues 57. It may be readily seen that, by properly selecting the area of the exposed portion of the pressure-balancing ring 56, the resultant hydro-static pressure acting upon the gear-rim holder may be reduced to zero or to some other value which may be found to be advantageous.

When the annular gear wheel 11 is fully engaged with the pinions 8, the output of the pump 5 is greater than the output of the pump 6 and, consequently, by reason of the fact that the pumps are connected by a closed hydraulic circuit when the transmission mechanism is in operation, the pump 6 must rotate faster than the pump 5 in order to compensate for the difference in volume displacement. By moving the ring gear wheel 11 to the left to a predetermined position, the volume displacement of the pump 5 may be made equal to the volume displacement of the pump 6. When the speed-reduction mechanism is adjusted in this manner and the gear rim 11 is held stationary by means of the brake band 43, the gear wheel 12 will also remain stationary when the spider 13 is rotated, and the transmission fluid will simply be pumped from the pump 5 towards the pump 6 and from the pump 6 towards the pump 5 at negligible pressure. When operating in this condition, the pinion elements 8 and 9 are necessarily turning at the speed of the driving member 2, and both the gear element 11 and the gear element 12 are stationary relative to the housing 4 and, therefore, it may be said that the speed of the driven shaft 3, relative to the gear wheel 11, is zero.

As shown in Fig. 3, the hydraulic circuit 7 is so connected that when the output of the pump 5 is made greater than the output of the pump 6, the gear wheel 12 will be caused to rotate, relative to the gear wheel 11, in a direction opposite to the direction of rotation of the spider 13, in order that the additional volume of fluid expelled by the pump 5 may be transmitted through the pump 6. When operating in this manner, the pump 6 functions as a hydraulic motor and exerts torque upon the shaft 3 in a direction opposite to the direction of rotation of the spider 13.

However, if the volumetric displacement of the pump 5 is reduced by moving the annular gear wheel 11 to the left, as shown in Fig. 2, the relative speeds between the gear wheel 12 and the spider 13 will necessarily be reduced in order that the output of the pump 6 may remain equal to the reduced output transmitted through the pump 5. When the volumetric displacement of pump 5 is reduced, the gear wheel 12 and the driven member 3 will be carried in a predetermined direction, while the spider 13 and the fluid pressure developed by the pump 6 will be exerted upon the pump 5 in such manner that it will add to the torque supplied to the spider 13 by the driving shaft 2. When rotating in this direction, the total torque on the input or driving shaft 2 is transmitted directly, by means of the pump 6, to the driven or output shaft 3, and additional or feed-back torque is also exerted upon the driven shaft 3 by reason of the fact that the pump 6 drives the pump 5 as a hydraulic motor. It may be readily seen that, if the volumetric displacement of the pump 5 (which is now acting as a hydraulic motor) is further reduced, the speed of the shaft 3 will be increased, and a greater percentage of the torque on the shaft 3 will be transmitted directly from the input or driving shaft 2.

If, now, the annular gear wheel 11 is moved entirely out of engagement with the pinions 8 to the position shown in Fig. 2, and the output of the hydraulic motor 5 is thereby reduced to zero, then the relative velocity between the gear wheel 12 and the cooperating pinions 9 of the pump 6 will also be reduced to zero, and the driven shaft 3 will rotate at substantially the speed of the driving shaft 2.

When this condition of hydraulic lock occurs, it may be desirable to connect the driving shaft directly to the driven shaft 3 by mechanical means, in order that the speed-reduction mechanism may be relieved from all work, and the pressure of the transmission fluid reduced to substantially zero. In order to accomplish this result, the driven shaft 3 is provided with a clutch member 61 which is disposed to engage a cooperating clutch member 62 on the spider-end-plate member 23.

A shifting lever 63 is provided for engaging the clutch members in the usual well-known manner. After the clutch members 61 and 62 have been engaged, the annular gear wheel 11 and its supporting member 41 may be released by loosening the brake band 43 in order that they may turn with the spider 13 and, consequently, the entire speed-reducing mechanism 1 will rotate as a unit without relative movement between its various parts. It may be readily seen that, when the transmission mechanism is operating at a one-to-one ratio in this manner, its efficiency is substantially 100%. When operating at any other speed ratio in the forward direction, as hereinbefore described, only a portion of the power being transmitted passes through the hydraulic system, the remainder being transmitted directly to the driven shaft 3 by reason of the fact that the torque of the driving shaft 2 is exerted directly upon the gear wheel 12 and the total torque, therefore, is equal to the torque exerted by the driving shaft 2 upon the spider 13 and the pinions 9 plus the torque exerted by the hydraulic pressure on the pinions 9. Consequently, the total efficiency loss of the transmission mechanism is equal to the efficiency loss of the hydraulic system multiplied by the percentage of the total power which is being transmitted by the hydraulic system.

If it is desirable to do so, the speed-changing device 1 may be made to operate automatically in response to the torque on the driven shaft 3. It is evident that the pressure in the hydraulic system is in direct proportion to the torque being exerted by the pinions 9 upon the gear wheel 12. Hence, it is a simple matter to so proportion the balancing areas on the balancing ring 56 that a biasing force will be exerted which tends to increase the output of the pump 5 by moving the annular gear wheel 11 towards the right. This biasing force may be offset by means of a compression spring 65 which exerts a force upon the shifting lever 46 by reason of its engagement with the sliding plate 48 in such manner as to oppose the tendency of the pressure on the balancing areas to shift the housing 41 to the right.

Suitable means, such as a hand wheel 66, may be provided for adjusting the compression of the spring 65 and, consequently, adjusting the torque on the driving of input shaft 2. It may be readily seen that, as the torque necessary to turn the driven shaft 3 becomes greater, the pressure in the hydraulic system will increase and exert a force upon the balancing ring 56 which will shift the gear wheel 11 to the right in opposition to the biasing spring 65. Moving the gear wheel to the right will increase the capacity of the hydraulic motor 5 and, consequently, reduce the speed, as well as increase the torque, exerted upon the driven shaft 3 without materially changing the torque necessary to be applied to the driving shaft 2.

Although I have described a particular embodiment of my invention, it will be clear to those skilled in the art that various modifications may be made in the design of the detail parts of the transmission mechanism and their disposition relative to one another without departing from the spirit and scope of the invention, as defined in the appended claims.

I claim as my invention:

1. In a hydraulic transmission mechanism, in combination, two pump mechanisms, one comprising an annular gear wheel and a plurality of cooperating pinions and the other comprising a spur gear wheel and a plurality of cooperating pinions, driving means for actuating the pinions, a closed hydraulic circuit for connecting the two pump mechanisms, a driven member connected to the spur gear wheel, means for holding the annular gear wheel stationary, and means for varying the output of the first pump mechanism to change the ratio between the driving means and the driven member.

2. In a hydraulic transmission mechanism, in combination, two pump mechanisms, one comprising an annular gear wheel and a plurality of cooperating pinions and the other comprising a spur gear wheel and a plurality of cooperating pinions, driving means for actuating the pinions, a closed hydraulic circuit for connecting the two pump mechanisms, a driven member connected to the spur gear wheel, means for holding the annular gear wheel stationary, and means for varying the output of the first pump mechanism to change the ratio between the driving means and the driven member, said means comprising mechanism for moving the ring gear wheel relative to its meshing pinions.

3. In a hydraulic transmission mechanism, in combination, two pump mechanisms, one comprising an annular gear wheel and a plurality of cooperating pinions and the other comprising a spur gear wheel and a plurality of cooperating pinions, driving means for actuating the pinions, a closed hydraulic circuit for connecting the two pump mechanisms, a driven member connected to the spur gear wheel, means for holding the annular gear wheel stationary, means for varying the output of the first pump mechanism to vary the ratio between the driving means and the driven member, means for releasing the annular gear wheel, and means for mechanically connecting the driving means to the driven member.

4. A hydraulic transmission comprising a driven member, a gear wheel carried by the driven member, a driving member, a spider carried by the driving member, a gear wheel journalled in the spider for meshing with the gear wheel on the driven member to constitute a hydraulic pump, an annular gear wheel encircling the spider, a second gear wheel journalled in the spider for meshing with the annular gear wheel to constitute a second hydraulic pump, and a closed hydraulic circuit for connecting the two pumps.

5. A hydraulic transmission mechanism comprising a driving member, a spider carried by the driving member, a gear wheel disposed within the spider, a driven element secured to the gear wheel, an annular gear wheel disposed to encircle the spider, pinions journalled in the spider for engaging the gear wheel to constitute a pump mechanism, other pinions journalled in the spider for engaging the annular gear wheel to constitute a second pump mechanism, and a closed hydraulic circuit for connecting the two pump mechanisms.

6. A hydraulic transmission mechanism comprising a driving member, a spider carried by the driving member, a gear wheel disposed within the spider, a driven element secured to the gear wheel, an annular gear wheel disposed to encircle the spider, pinions journalled in the spider for engaging the gear wheel to constitute a pump mechanism, other pinions journalled in the spider for engaging the annular gear wheel to constitute a second pump mechanism and a closed hydraulic circuit for connecting the two pump mechanisms, and means for varying the output of one of the pump mechanisms to vary the ratio of the speed of the driving member to the driven member.

7. A hydraulic transmission mechanism comprising a driving member, a spider carried by the driving member, a gear wheel disposed within the spider, a driven element secured to the gear wheel, an annular gear wheel disposed to encircle the spider, pinions journalled in the spider for engaging the gear wheel to constitute a pump mechanism, other pinions journalled in the spider for engaging the annular gear wheel to constitute a second pump mechanism, a closed hydraulic circuit for connecting the two pump mechanisms, and means for moving the annular gear wheel axially to vary the output of one of the pump mechanisms, whereby the speed ratio between the driving and the driven shafts may be varied.

8. A hydraulic transmission mechanism comprising a driving member, a spider carried by the driving member, a gear wheel disposed within the spider, a driven element secured to the gear wheel, an annular gear wheel disposed to encircle the spider, pinions journalled in the spider for engaging the gear wheel to constitute a pump mechanism, other pinions journalled in the spider for engaging the annular gear wheel to constitute a second pump mechanism, a closed hydraulic circuit for connecting the two pump mechanisms, and means responsive to the pressure in the hydraulic circuit for moving the annular gear wheel relative to its cooperating pinion to adjust the capacity of the pump mechanism and thereby automatically regulate the ratio of the speed of the driving member to the driven member in response to the torque of the driven member.

9. A hydraulic transmission mechanism comprising a driving element, a spider mounted on the driving element, a plurality of pinions rotatably mounted in the spider, an annular gear rim for engaging the pinions to constitute a gear hydraulic pump, means for preventing the annular gear ring from rotating, means for varying the axial position of the annular gear rim to adjust the rate of pumping of the gear pumps, a second set of pinions rotatably mounted in the spider, a driven element, a gear wheel on the driven element for engaging the second set of pinions in the spider to constitute a hydraulic motor, and means for transmitting fluid from the pump to the motor.

In testimony whereof, I have hereunto subscribed my name this 4th day of January, 1929.

FRANCIS H. SHEPARD, Jr.